US012500906B2

United States Patent
Garg et al.

(10) Patent No.: US 12,500,906 B2
(45) Date of Patent: Dec. 16, 2025

(54) INTELLIGENT COGNITIVE AI BASED SECURE PROTOCOL CHANNEL TO CREATE AND DEPLOY PROJECTS ON DEMAND IN REAL TIME LEVERAGING UNIKERNELS

(71) Applicant: Bank of America Corporation, Charlotte, NC (US)

(72) Inventors: Saurabh Garg, Faridabad (IN); Bhagat Allugubelly, Hyderabad (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 80 days.

(21) Appl. No.: 18/623,446

(22) Filed: Apr. 1, 2024

(65) Prior Publication Data
US 2025/0310352 A1    Oct. 2, 2025

(51) Int. Cl.
*H04L 9/40* (2022.01)

(52) U.S. Cl.
CPC ........ *H04L 63/1416* (2013.01); *H04L 63/101* (2013.01); *H04L 2463/082* (2013.01)

(58) Field of Classification Search
CPC ............... H04L 63/1416; H04L 63/101; H04L 2463/082
USPC ......................................................... 726/23
See application file for complete search history.

(56) References Cited

U.S. PATENT DOCUMENTS

| | | | |
|---|---|---|---|
| 10,674,411 B2 | 6/2020 | Crawford | |
| 10,945,166 B2 | 3/2021 | Crawford | |
| 11,281,673 B2 | 3/2022 | Nanda et al. | |
| 11,361,071 B2 | 6/2022 | Noeth et al. | |
| 12,112,272 B2 * | 10/2024 | Pedersen | G06N 3/02 |
| 2018/0191849 A1 | 7/2018 | Xu | |
| 2020/0228932 A1 * | 7/2020 | Ernst | H04L 63/101 |

(Continued)

FOREIGN PATENT DOCUMENTS

| | | |
|---|---|---|
| CA | 3148698 A1 | 2/2021 |
| EP | 4127925 A1 | 2/2023 |

(Continued)

*Primary Examiner* — Badri Narayanan Champakesan
(74) *Attorney, Agent, or Firm* — Banner & Witcoff, Ltd.

(57) ABSTRACT

This invention introduces a sophisticated system for deploying projects on cloud platforms, combining Unikernels, Cyber Security Mesh Architecture (CSMA), MQTT protocol with SHA256 encryption, an Unikernel Orchestration Rules Engine (UORE), generative AI, and an innovative caching mechanism. Unikernels offer a secure, isolated environment for applications, reducing overhead and boosting performance. CSMA provides extensive security through analytics, identity management, and policy enforcement. The MQTT protocol, secured with SHA256, ensures the integrity and confidentiality of communications. UORE automates deployment, integrating a TLS terminator and data management for streamlined operation. Generative AI proactively resolves deployment challenges, particularly for complex applications, while the caching mechanism enhances performance and efficiency by minimizing latency. This integrated approach automates and secures the deployment process, enabling scalable, efficient, and real-time project creation and deployment in the cloud, thereby addressing the key challenges of cloud application hosting.

18 Claims, 5 Drawing Sheets

(56) References Cited

U.S. PATENT DOCUMENTS

| | | |
|---|---|---|
| 2021/0258265 A1 | 8/2021 | Bernat et al. |
| 2021/0263621 A1 | 8/2021 | Lee et al. |
| 2022/0014424 A1 | 1/2022 | Yadav et al. |
| 2022/0103593 A1* | 3/2022 | Singh .................. H04L 63/0245 |
| 2022/0351024 A1* | 11/2022 | Khayrallah ............ G06N 3/063 |
| 2023/0149135 A1 | 5/2023 | Lipnik et al. |
| 2023/0162089 A1 | 5/2023 | Farooq et al. |
| 2024/0022950 A1* | 1/2024 | Bouton ............. H04W 28/0247 |
| 2024/0031235 A1* | 1/2024 | Zhu ....................... H04W 24/02 |
| 2025/0063042 A1* | 2/2025 | Kim ....................... G06V 30/10 |

FOREIGN PATENT DOCUMENTS

| | | |
|---|---|---|
| EP | 4226589 A1 | 8/2023 |
| WO | 2019016576 A1 | 1/2019 |
| WO | 2022090809 A1 | 5/2022 |

* cited by examiner

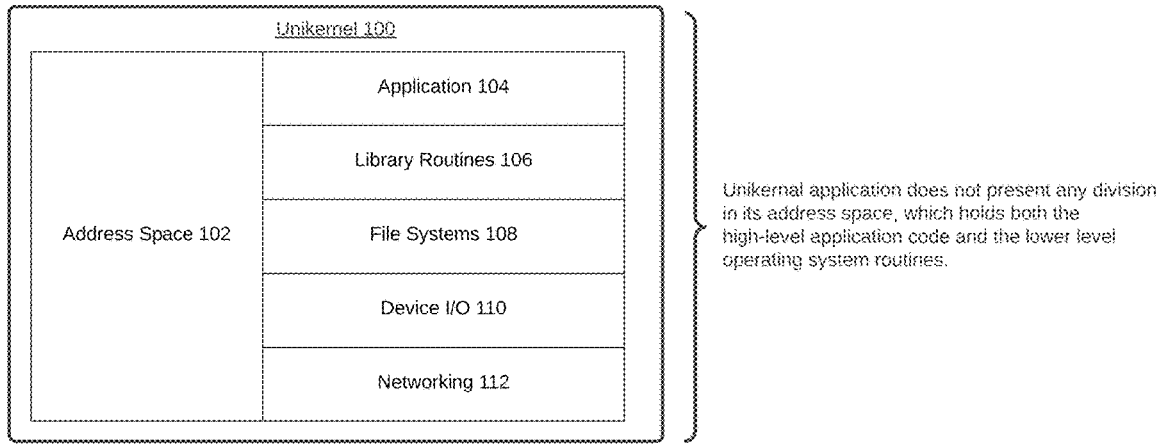
FIG. 1A
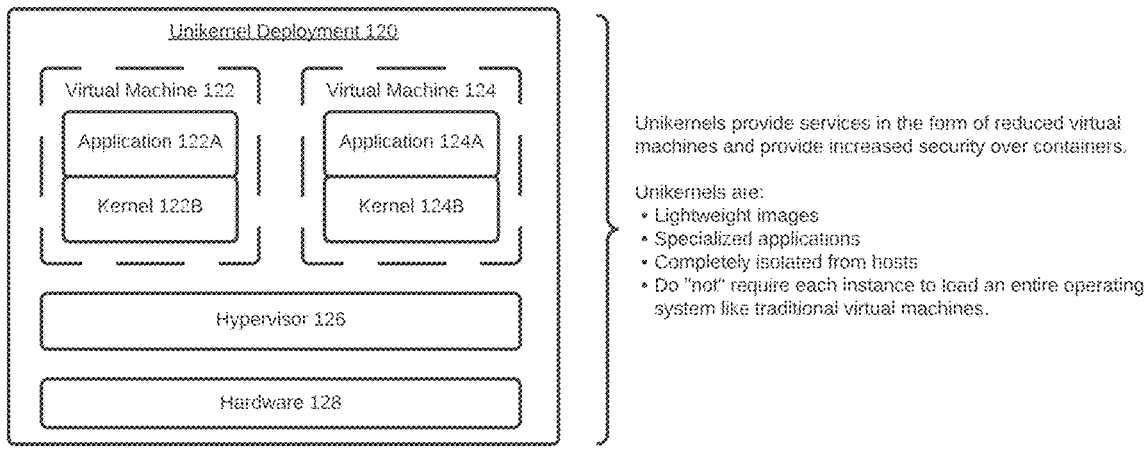
FIG. 1B
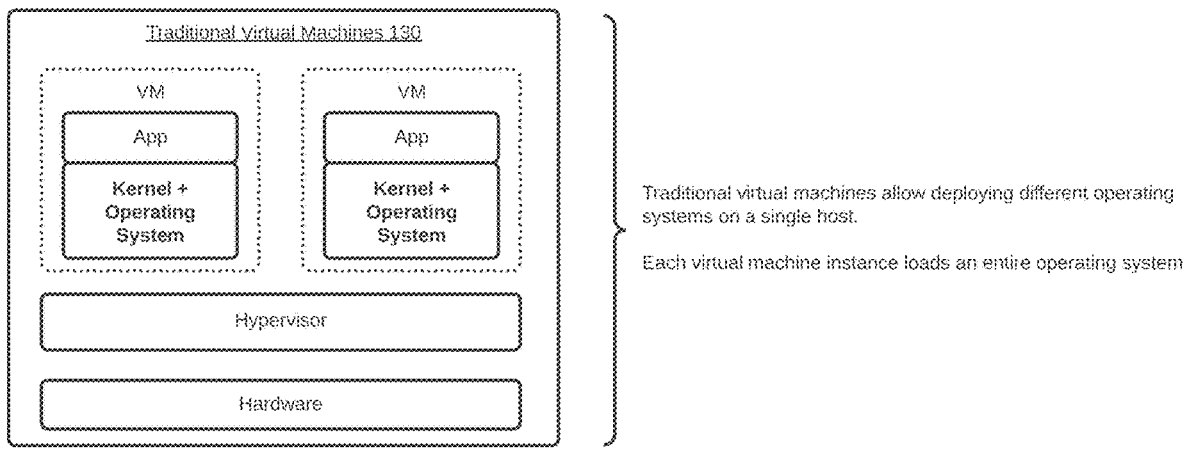
FIG. 1C (Prior Art) - Traditional Virtual Machines for Comparison

INTELLIGENT COGNITIVE AI BASED SECURE PROTOCOL CHANNEL TO CREATE AND DEPLOY PROJECTS ON DEMAND IN REAL TIME LEVERAGING UNIKERNELS

TECHNICAL FIELD

The present disclosure pertains to the field of electrical computers and digital processing systems, specifically to the multicomputer data transferring for deploying and managing applications in cloud computing environments. It integrates advancements in artificial intelligence (AI) and cybersecurity to automate the creation of secure, compatible, and efficient cloud deployment channels. The invention leverages Unikernels for lightweight, isolated application hosting, incorporates Cyber Security Mesh Architecture (CSMA) for enhanced security management, and utilizes a secured protocol (MQTT with SHA256 encryption) for reliable data communication across cloud services. Furthermore, it employs generative AI techniques for dynamic environment configuration and problem-solving, while ensuring data and application security through advanced encryption and secure communication protocols.

DESCRIPTION OF THE RELATED ART

Cloud application deployment capitalizes on the advantages of cloud computing to provide a modern solution for hosting, managing, and delivering applications over the internet. This eliminates the need for physical hardware investments by offering virtualized computing resources through Infrastructure as a Service (IaaS). It simplifies the complexity of application development and deployment by providing a comprehensive platform with Platform as a Service (PaaS) and delivers applications directly to users over the internet on a subscription basis via Software as a Service (SaaS). The cloud environment facilitates rapid development and testing, enhancing collaboration and efficiency across geographically dispersed teams. One of the most advantages of cloud deployment is its scalability, allowing resources to be dynamically adjusted to meet demand without manual intervention. Continuous monitoring and management tools are available to ensure applications perform optimally and remain secure.

The benefits of cloud application deployment are manifold. It offers cost-effectiveness by reducing capital expenditure on physical infrastructure and operational costs through pay-as-you-go pricing models. Accessibility is greatly enhanced, as applications can be accessed from anywhere, supporting remote work and providing greater flexibility. The ability to scale resources dynamically ensures consistent performance even under varying loads. Cloud deployment also reduces the burden of maintenance and updates on internal IT teams, as these responsibilities are managed by the cloud provider. Additionally, robust backup and disaster recovery solutions enhance data integrity and application availability. Finally, the cloud enables faster deployment of applications, allowing businesses to quickly adapt to market changes and efficiently deliver services to users. Overall, cloud application deployment harnesses the power of cloud computing to transform business operations and service delivery, making it a scalable, accessible, and cost-efficient solution.

Currently, there are several challenges associated with hosting applications in cloud environments. These challenges can significantly hinder the efficiency, security, and scalability of cloud-based applications. These problems include:

1. Complex Application Environment Setup
   a. Diverse Cloud Service Integration: Modern applications often rely on a range of cloud services, including databases, messaging queues, and storage solutions. Integrating these services requires a deep understanding of each service's API and configuration nuances, making the setup process complex and error prone.
   b. Dependency Management: Applications have dependencies on libraries, frameworks, and other services. In a cloud environment, ensuring that all dependencies are correctly managed and up to date across different deployment stages (development, testing, production) can be challenging.

2. Compatibility Issues
   a. Platform-Specific Dependencies: Applications developed for a specific platform or environment may utilize certain features or services unique to that platform. When moving to a cloud environment, these dependencies can lead to compatibility issues, requiring significant modifications to the application code.
   b. Middleware Incompatibilities: Middleware such as web servers, application servers, and database management systems can behave differently in cloud environments, leading to unexpected application behavior or performance issues.

3. Manual Intervention for Environment Configuration
   a. Resource Provisioning and Scaling: Manually provisioning cloud resources and scaling them in response to demand can be time-consuming and prone to errors. This includes choosing the right size and type of computing instances, configuring load balancers, and setting up auto-scaling policies.
   b. Security Configuration: Setting up security measures such as firewalls, encryption, and access controls often requires manual intervention. Misconfigurations in these areas can expose applications to security vulnerabilities.

4. Unsuccessful Deployment Risks
   a. Deployment Failures: The complexity of cloud environments can lead to deployment failures due to misconfigurations, compatibility issues, or resource constraints. These failures can be costly in terms of time, resources, and missed opportunities.
   b. Troubleshooting and Recovery: Identifying the root cause of deployment failures in cloud environments can be difficult. Recovery often requires extensive logs analysis, testing, and redeployment, further delaying the application availability.

5. Security Concerns
   a. Data Privacy and Compliance: Ensuring that data stored and processed in the cloud complies with privacy regulations and industry standards is a significant challenge. This includes managing data encryption, access controls, and audit logs.
   b. Vulnerability Management: Cloud environments must be continuously monitored and updated to protect against new vulnerabilities and security threats. This requires ongoing security assessments and the implementation of patches and updates.

6. Need for Scalable and Efficient Solutions
   a. Elasticity Challenges: Efficiently scaling cloud resources to meet fluctuating demand while minimizing costs requires sophisticated management strategies.

Traditional methods may not provide the agility needed to respond to rapid changes in demand.

b. Performance Optimization: Ensuring that applications perform optimally in the cloud requires tuning resources, load balancing strategies, and caching mechanisms. This optimization is crucial for maintaining a good user experience and can be complex to achieve with manual methods.

Hence there is a need for an innovative approach to automate and streamline the deployment process, reduce compatibility issues, enhance security, and ensure scalability and efficiency in cloud application hosting.

SUMMARY OF THE INVENTION

The present disclosure presents a sophisticated advancement in cloud computing deployment and security. Addressing the challenges of deploying applications in cloud environments, the invention integrates cutting-edge technologies such as Artificial Intelligence (AI), Cybersecurity Mesh Architecture (CSMA), and Unikernels. These technologies work in concert to automate and secure the deployment process, enhance scalability and efficiency, and solve common problems like complex setup procedures, compatibility issues, and manual intervention for environment configuration. The core of this invention lies in its ability to provide a secure, isolated environment for applications through the use of Unikernels, which are lightweight virtual machines that include only the necessary operating system elements required by the application, significantly reducing resource usage and enhancing security.

The invention's novelty is further emphasized through the employment of a secured protocol (MQTT with SHA256 encryption) for reliable data communication across cloud services, ensuring the integrity and confidentiality of data during transmission. Additionally, the Cyber Security Mesh Architecture (CSMA) offers a comprehensive security framework that spans analytics, identity management, policy enforcement, and monitoring, creating a holistic approach to cloud application security. This framework not only enhances the security posture but also facilitates compliance with privacy regulations and standards.

A significant component of the invention is the Unikernel Orchestration Rules Engine (UORE), which automates the deployment and management of cloud resources. This automation encompasses a range of functions from resource provisioning and scaling to the application of security measures, thereby minimizing the risks associated with manual configurations and deployment failures. The UORE integrates tools like TLS terminators and proxy routers, further streamlining the deployment process and enhancing the efficiency of data communication.

The use of generative AI within this invention plays a pivotal role in dynamically addressing deployment challenges, particularly for applications with unique requirements. This AI-driven approach not only generates solutions for complex problems but also aids in decision-making by simulating various deployment strategies and predicting outcomes. This ensures that applications, regardless of their underlying technology stacks, can be deployed smoothly and efficiently on cloud platforms.

Lastly, the invention introduces an innovative caching mechanism designed to optimize performance and efficiency by reducing latency and speeding up data retrieval across cloud nodes. This mechanism, combined with the aforementioned technologies, creates a robust and integrated system capable of overcoming traditional barriers to efficient and secure cloud hosting. By leveraging these advancements, the invention paves the way for scalable, accessible, and cost-efficient cloud computing practices, making it a transformative solution for businesses looking to harness the power of cloud technology.

Unikernels are utilized for optimized application hosting. Unikernels represent a significant advancement in virtualization technology, offering an alternative to traditional virtual machines (VMs) and containers. They are single-purpose, lightweight VMs that bundle an application with only the necessary elements of the operating system required for it to run. This results in:

a. Reduced overhead: Unikernels eliminate the unnecessary bloat of traditional OSes, ensuring minimal resource usage and faster startup times.

b. Enhanced security: By minimizing the attack surface through isolation and the inclusion of only essential components, Unikernels significantly reduce vulnerability to cyber threats.

c. Improved performance: The lightweight nature of Unikernels contributes to enhanced performance, particularly in cloud environments where resources are shared among multiple tenants.

Cyber Security Mesh Architecture (CSMA) is used to provide advanced security and is an innovative security framework that provides a holistic approach to securing cloud-based applications. It encompasses:

a. Security Analytics and Intelligence: Utilizes advanced analytics to monitor for and identify potential security threats in real time.

b. Distributed Identity Fabric: Manages identities efficiently across various platforms, ensuring secure and controlled access.

c. Consolidated Policy and Posture Management: Harmonizes security policies across different layers of the cloud infrastructure, ensuring consistent application and compliance.

d. Consolidated Dashboards: Offers a unified view for monitoring the security status, enabling quick identification and response to threats.

A MQTT Protocol (Messaging Queue for Telemetry Transport) is enhanced with SHA256 encryption for secure communication. The MQTT protocol ensures secure and efficient communication between the cloud infrastructure and applications. This protocol is designed for lightweight, low-power devices in IoT contexts but is equally effective for cloud applications, providing:

a. Secure data transmission: SHA256 encryption ensures that data is protected against tampering and eavesdropping during transmission.

b. Efficient messaging: MQTT's publish-subscribe model facilitates efficient data exchange, reducing bandwidth and resource usage.

Unikernel Orchestration Rules Engine (UORE) automates the deployment and management process, incorporating several components:

a. TLS Terminator offloads SSL/TLS decryption to improve resource efficiency.

b. Encoder and Proxy Router manage secure data encoding and routing.

c. Unikernels-Op automates the operation and scaling of Unikernels.

d. Data and Log Stores consolidate logging for easier monitoring and troubleshooting.

Generative AI is used for problem solving and is employed to dynamically address challenges and streamline the deployment process. It:

a. Generates solutions for complex problems encountered during deployment, particularly for applications with unique hosting requirements.

b. Improves decision-making by simulating different deployment strategies and predicting their outcomes.

Cache Over Nodes is used for performance enhancement. By implementing a caching mechanism across cloud nodes, the invention aims to:

a. Reduce latency by storing frequently accessed data closer to where it is needed.

b. Enhance performance by speeding up data retrieval and processing times.

c. Improve efficiency by clearing caches post-connection to maintain optimal performance for subsequent requests.

This invention's technical solution combines one or more of the foregoing innovative components into a dynamic system(s) that provide improved solutions to address the traditional challenges of cloud application deployment. By optimizing for security, performance, and efficiency, it provides a robust framework for deploying and managing cloud-based applications, paving the way for more secure, scalable, and efficient cloud computing practices.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method is designed for deploying projects on cloud platforms with the aim of enhancing security, efficiency, and scalability. This method begins by initiating a cloud-based deployment process through a Unikernels Orchestration Rules Engine (UORE). The UORE is specifically designed to automate and manage the deployment and scaling of applications within a cloud computing environment, which ensures efficient resource utilization and optimal operational performance. As part of this deployment process, a Cyber Security Mesh Architecture (CSMA) is configured. The CSMA provides a comprehensive and integrated security framework that incorporates advanced analytics for real-time threat monitoring, distributed identity management for secure access control, consolidated policy management for uniform security protocol enforcement across the cloud ecosystem, and a unified dashboard for a comprehensive view of the security posture. This framework acts as a robust defense mechanism against emerging security threats and vulnerabilities.

Applications are then deployed within Unikernel containers. Each Unikernel container encapsulates an application along with the minimal, essential set of operating system libraries and routines required for the application's execution. This creates a streamlined, lightweight, and isolated execution environment that reduces computational overhead, minimizes the attack surface for enhanced security, and boosts application performance within the cloud infrastructure. The data communication channels are secured through the implementation of the MQTT protocol, enhanced with SHA256 encryption. This step safeguards the integrity and confidentiality of data transmissions across the cloud, ensuring secure and reliable messaging between devices and the cloud infrastructure, and is particularly suited for IoT applications and scenarios demanding high network efficiency and data security.

The deployment process is further refined by employing generative artificial intelligence (AI) techniques. The generative AI component analyzes the unique requirements and challenges associated with each application deployment, generating custom deployment strategies and solutions to overcome potential hurdles. This ensures that applications, irrespective of their complexity or the specific needs of their technology stack, are efficiently and effectively deployed on cloud platforms. A distributed caching mechanism is implemented across multiple cloud nodes to enhance the overall performance and efficiency of the cloud infrastructure. This mechanism reduces latency and accelerates data retrieval processes by strategically storing frequently accessed data closer to the point of use and automatically clears caches post-connection to maintain optimal performance for subsequent requests, thereby improving user experience and application responsiveness.

Monitoring and analyzing the deployment process and the ongoing performance of deployed applications is facilitated using the consolidated dashboards provided by the CSMA. This enables real-time visibility into application health, performance metrics, and security alerts, which in turn, allows for proactive management and optimization of the cloud environment. Managing digital identities and access controls across the cloud platform is achieved through the implementation of a Distributed Identity Fabric. This fabric ensures secure and controlled access to cloud resources by efficiently managing identities, authentication, and authorization processes across various platforms and applications within the cloud ecosystem, thereby enhancing security and compliance. Lastly, Transport Layer Security (TLS) connections are terminated as part of the deployment process to ensure secure data transmission between client applications and the cloud infrastructure. A TLS terminator offloads SSL/TLS decryption from the Unikernel containers, improving resource efficiency and bolstering the security of data in transit.

In some arrangements, the method enhances cloud-based project deployments by incorporating advanced AI and dynamic system adjustments. It starts with using generative AI to perform pre-deployment simulations, identifying potential issues and mitigating risks to improve deployment reliability. The method dynamically adjusts caching strategies based on real-time usage and network conditions, optimizing cloud application responsiveness. It includes automated scaling of Unikernel containers according to real-time demand and predefined performance metrics, ensuring efficient resource allocation. Continuous security monitoring within the CSMA framework detects and responds to threats in real-time, maintaining a proactive security posture. The generative AI uses machine learning to refine deployment strategies based on outcomes and metrics, enhancing system adaptability. Performance and security metrics across cloud services are aggregated and visualized for comprehensive management. A feedback loop informs adjustments to deployment strategies, security configurations, and resource allocations, fostering continuous improvement. The method integrates automated incident response protocols within CSMA for rapid threat mitigation. Finally, it enforces multi-factor authentication and role-based access controls for all users, bolstering cloud deployment security and integrity.

In some arrangements, a system is designed for deploying projects on cloud platforms, aiming to enhance security, efficiency, and scalability. At the core of this system lies the Unikernels Orchestration Rules Engine (UORE), a sophisticated mechanism configured to automate the deployment and management of applications within a cloud computing environment. This engine ensures that resources are utilized efficiently, and that operational performance is optimized. Integrated within the system is the Cyber Security Mesh Architecture (CSMA), which provides a comprehensive security framework. The CSMA is equipped with modules for advanced analytics dedicated to real-time threat monitoring, distributed identity management for secure access control, consolidated policy management for uniform security protocol enforcement across the cloud ecosystem, and a unified dashboard module that offers comprehensive visibility into the security posture.

To facilitate streamlined and secure application execution, Unikernel container modules are utilized. These modules encapsulate applications along with only the essential set of operating system libraries and routines required for execution. This design minimizes computational overhead and enhances security by offering lightweight and isolated execution environments. Communication security is paramount, addressed by a secure communication module that utilizes the MQTT protocol, enhanced with SHA256 encryption. This ensures the integrity and confidentiality of data transmissions across the cloud, safeguarding communication channels.

A generative AI module is employed to dynamically adapt and optimize the deployment process, considering the unique requirements and challenges of each application deployment. This module generates custom deployment strategies and solutions, ensuring applications are deployed efficiently and effectively. The system's performance and efficiency are further enhanced by a distributed caching mechanism implemented across multiple cloud nodes. This mechanism reduces latency and accelerates data retrieval processes by strategically storing frequently accessed data closer to the point of use.

Real-time visibility into application health, performance metrics, and security alerts is facilitated by a monitoring and analysis module that utilizes consolidated dashboards provided by the CSMA. This enables proactive management and optimization of the cloud environment. Additionally, a digital identity and access control management module implements a Distributed Identity Fabric, ensuring secure and controlled access to cloud resources by efficiently managing identities, authentication, and authorization processes.

Lastly, a Transport Layer Security (TLS) termination module is configured to secure data transmission between client applications and the cloud infrastructure. This module offloads SSL/TLS decryption from the Unikernel containers, improving resource efficiency and enhancing the security of data in transit. Together, these components form a cohesive system that significantly enhances the deployment of projects on cloud platforms, emphasizing security, efficiency, and scalability.

In some arrangements, the system for deploying projects on cloud platforms can be further enhanced by a series of sophisticated features building upon the core components outlined above. The generative AI module is configured to conduct pre-deployment simulations, leveraging artificial intelligence to foresee potential deployment challenges and performance issues by simulating various scenarios. This predictive approach aims to enhance the reliability and efficiency of cloud-based project deployments.

An adaptive caching strategy module within the distributed caching mechanism dynamically adjusts caching strategies based on real-time application usage patterns and network conditions. This ensures that caching logic remains optimal for the current operational state, thus enhancing the responsiveness of cloud-hosted applications. An automated scaling module within the Unikernel container modules is introduced, which adjusts the number of active Unikernel instances based on predefined performance metrics and real-time demand. This ensures efficient resource allocation and maintains application performance at optimal levels.

The system includes a continuous security monitoring module within the CSMA, designed for ongoing analysis of security logs, network traffic, and system activities. This module enables the detection and real-time response to emerging threats, maintaining a proactive and adaptive security posture. Furthermore, the generative AI module incorporates machine learning algorithms to continuously learn from deployment outcomes and operational metrics, refining deployment strategies and enhancing the system's adaptability and performance.

The monitoring and analysis module is enhanced to aggregate and visualize performance and security metrics across multiple cloud services and platforms. This provides a unified operational view through the consolidated dashboards, enabling comprehensive management of cloud resources and security. A feedback mechanism communicates insights from the monitoring and analysis module back to the generative AI module and the UORE. This facilitates ongoing adjustments to deployment strategies, security configurations, and resource allocations based on real-time data, promoting a cycle of continuous improvement.

Lastly, the system includes an integrated incident response protocol within the CSMA. This protocol is configured to trigger predefined mitigation actions upon the detection of security threats, such as isolating affected systems, applying security patches, or adjusting access controls. This ensures rapid and effective response to security incidents, further bolstering the security and integrity of cloud-based project deployments.

In some arrangements, a method for deploying and managing projects on cloud platforms involves a series of steps designed to automate and enhance various aspects of cloud computing. The process begins with the automation of application deployment and management across a cloud computing environment, utilizing an Orchestration Rules Engine (UORE). This engine ensures the efficient utilization of cloud resources and optimizes operational performance, laying the groundwork for a streamlined cloud infrastructure. To address security concerns, a Cyber Security Mesh Architecture (CSMA) is implemented, providing a comprehensive security framework. This framework incorporates advanced analytics for real-time threat detection, distributed identity management for secure access control, consolidated policy management to enforce security protocols, and a unified dashboard to offer visibility into the overall security posture.

The deployment of applications is facilitated through the use of Unikernel containers. These containers encapsulate each application with only the essential operating system components needed for execution, creating lightweight and secure execution environments that minimize computational overhead. Data communications across the cloud are secured using an MQTT protocol enhanced with SHA256 encryption, ensuring the integrity and confidentiality of data.

To further optimize the cloud deployment process, generative artificial intelligence (AI) is employed. This generative AI dynamically adapts and optimizes the deployment process for each application, generating custom deployment strategies and solutions based on the unique requirements and challenges of each application. This ensures that applications are deployed efficiently and effectively, regardless of their complexity.

A distributed caching mechanism is implemented across cloud nodes to enhance the overall performance and efficiency of the cloud infrastructure. This mechanism reduces latency and accelerates data retrieval processes by storing frequently accessed data closer to the point of use. Real-time visibility into application health, performance metrics, and security alerts is achieved through the use of a monitoring and analysis module. This module utilizes consolidated dashboards provided by the CSMA, facilitating proactive cloud management and optimization.

Managing digital identities and access controls is critical for ensuring secure and controlled access to cloud resources. This is achieved through the implementation of a Distributed Identity Fabric, which efficiently manages authentication and authorization processes. Lastly, Transport Layer Security (TLS) connections are terminated as part of the deployment process to improve data security and resource efficiency during data transmission between client applications and the cloud infrastructure. This comprehensive method streamlines the deployment and management of projects on cloud platforms, enhancing security, efficiency, and scalability.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

BRIEF DESCRIPTION OF DRAWINGS

FIG. 1A pertains to the concept of Unikernels and their application in creating isolated, efficient, and secure environments for cloud-hosted applications.

FIG. 1B illustrates the deployment of applications using Unikernels in a cloud environment, showcasing the contrast between Unikernels and traditional virtual machine (VM) deployments. It highlights the architecture and benefits of using Unikernels for running applications on virtualized hardware.

FIG. 1C provides a comparison by illustrating the traditional virtual machine (VM) deployment model, which contrasts with the Unikernel approach depicted in FIGS. 1A and 1B.

DETAILED DESCRIPTION

Figure 2:
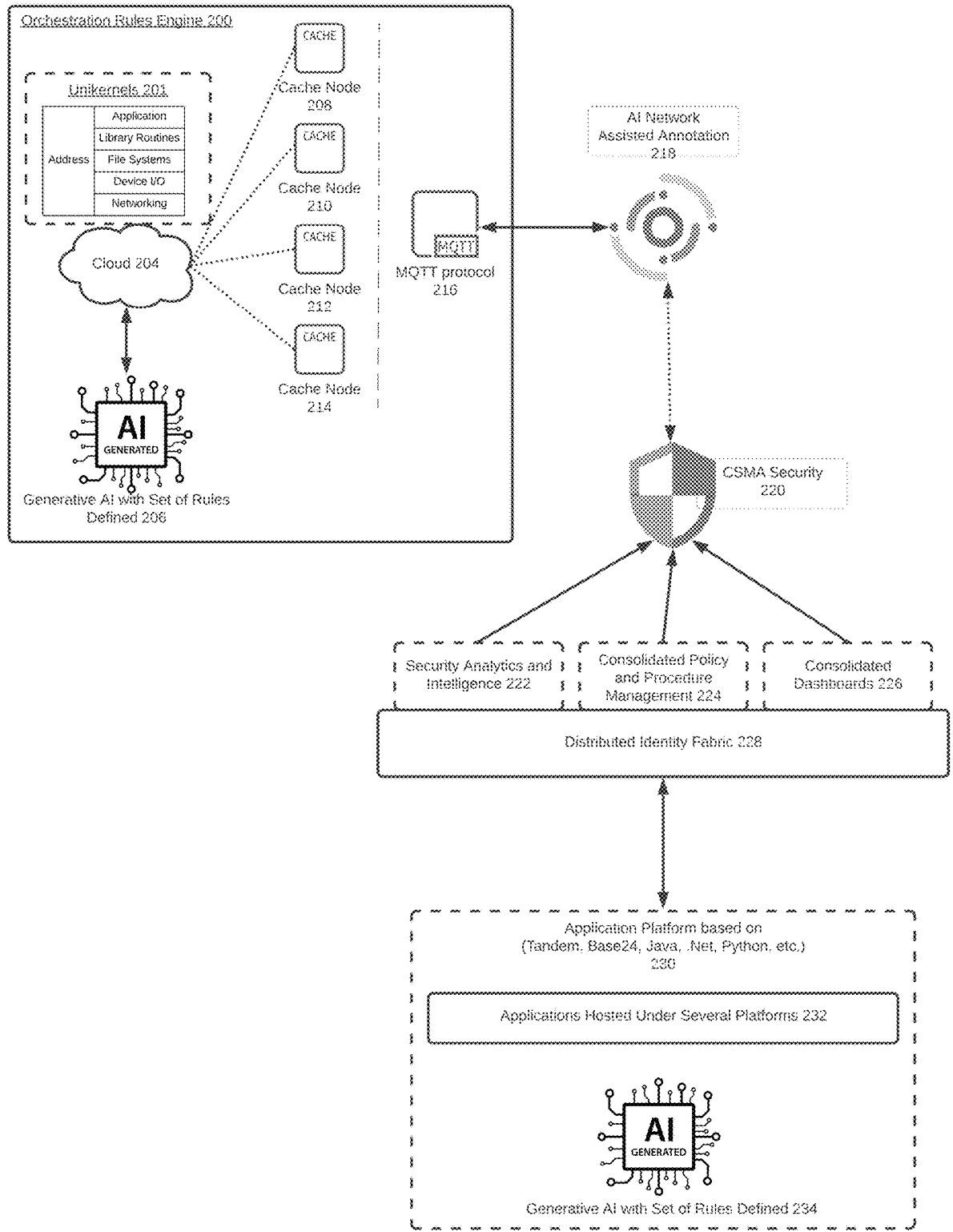
FIG. 2 depicts a technical architecture diagram for deploying and managing cloud-based projects, focusing on utilizing Unikernels and advanced AI. It showcases an Orchestration Rules Engine coordinating the deployment of applications encapsulated in Unikernels, integrating a Cyber Security Mesh Architecture (CSMA) for security, and employing generative AI for optimizing deployment strategies.

At a high level, the invention presents an innovative approach to cloud application deployment, utilizing a unique combination of advanced technologies to address and overcome the prevailing challenges in the cloud computing domain. This invention revolutionizes how projects are deployed on cloud platforms, making the process more secure, efficient, and scalable.

At the core of the invention is the use of Unikernels, specialized, lightweight virtual machines that encapsulate an application along with the minimal necessary set of operating system libraries and components. This approach significantly reduces the overhead typically associated with traditional virtual machines or containers, offering a leaner, more secure environment for application hosting. Unikernels provide enhanced isolation and minimize the attack surface, making them ideal for sensitive or security-critical applications.

To further bolster the security and efficiency of cloud deployments, the invention integrates a Cyber Security Mesh Architecture (CSMA). CSMA is a comprehensive framework that extends security beyond traditional perimeters, enabling a more flexible and resilient defense posture across the entirety of the digital estate. It employs advanced analytics for real-time threat monitoring, distributed identity management for secure access, and consolidated policy management to ensure uniform security protocols across the cloud environment.

Another key component of the invention is the implementation of the MQTT (Messaging Queue for Telemetry Transport) protocol with SHA256 encryption for data communication. This ensures secure, efficient, and reliable messaging between devices and the cloud, safeguarding data integrity and confidentiality during transmission. The lightweight nature of the MQTT protocol, combined with robust encryption, makes it particularly suited for IoT applications and other scenarios where network efficiency and data security are paramount.

The orchestration of deployment and management processes is automated through an Unikernel Orchestration Rules Engine (UORE), which incorporates elements like TLS termination and proxy routing to streamline operations. This automation not only simplifies the deployment process but also significantly reduces the risk of human error that could lead to security vulnerabilities or deployment failures.

Lastly, the invention leverages generative AI to dynamically solve complex problems and optimize deployment strategies, ensuring that applications can be efficiently and reliably deployed regardless of their specific requirements or the underlying technology stack. In addition, an innovative caching mechanism is employed across cloud nodes to enhance performance and efficiency by minimizing latency and improving data retrieval times.

In summary, this invention introduces a sophisticated, integrated system that leverages Unikernels, CSMA, secure communication protocols, automated orchestration, generative AI, and caching mechanisms to transform cloud application deployment. It addresses key challenges such as complexity, security, scalability, and efficiency, offering a scalable, secure, and cost-efficient solution for deploying and managing cloud-based applications in real time.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications—internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1A provides a detailed illustration of a Unikernel 100, showcasing the architecture and components that make Unikernels a unique and efficient option for hosting applications in cloud environments. The diagram visualizes several key aspects and components of Unikernels, emphasizing their streamlined, minimalistic approach to application deployment.

As shown in the figure, a Unikernel application does not present any division in its address space, which holds both the high-level application code and the lower-level operating system routines. This highlights a fundamental architectural difference between Unikernels and traditional operating system deployments.

In traditional operating systems (OS), there is a clear distinction between user space and kernel space:
  a. User Space: This is where the application code runs. Applications in user space have limited access to the hardware and must communicate with the kernel to perform operations like reading from a file, sending network packets, or accessing physical devices. This separation serves as a form of protection and stability, ensuring that misbehaving applications do not compromise the entire system.
  b. Kernel Space: The kernel operates in this space. It has unrestricted access to the hardware and provides the low-level operating system routines that user-space applications rely on. The kernel manages hardware resources, executes tasks like scheduling, and handles system calls from user-space applications.

Unikernels, however, merge these two spaces into a single unified address space. This means that the application and the minimal set of necessary OS libraries and routines it requires are compiled together into a single executable image. There are no separate user and kernel spaces; the application has direct access to the hardware through the included OS routines, without the overhead of switching contexts between user and kernel modes. This architecture has several implications:
  a. Efficiency: By eliminating the division between user and kernel space, Unikernels reduce the overhead associated with context switches and system calls. This can lead to better performance, as operations that would typically require transitioning to kernel space can be executed directly.
  b. Security: Unikernels include only the specific OS components that the application needs, significantly reducing the attack surface compared to a full OS. The lack of division in the address space means there are fewer mechanisms (and thus, potentially fewer vulnerabilities) for an attacker to target.
  c. Simplicity: With everything compiled into a single image, Unikernels are simpler to deploy and manage. There's no need to maintain separate user and kernel environments, which simplifies the system's architecture.
  d. Isolation: Since each Unikernel runs as a separate virtual machine instance, it is naturally isolated from other applications. This isolation is beneficial for security and stability, as faults or security breaches in one Unikernel do not affect others.

This approach of not presenting any division in the address space aligns with the Unikernel's goal of creating a lightweight, efficient, and secure execution environment for applications, particularly suited for cloud and distributed computing scenarios.

Referring specifically to the individual Unikernel elements depicted in FIG. 1A, the address space (102) illustrates how the Unikernel's address space encompasses both the application code and the selected OS libraries without any distinction between user space and kernel space. This unified address space is a hallmark of Unikernels, contributing to their efficiency and security by eliminating unnecessary layers and reducing the attack surface.

Application (104) is encapsulated within the Unikernel. This is the primary code or software that the Unikernel is designed to run. The application is tightly integrated with the necessary operating system functionalities, leading to a highly optimized execution environment.

Surrounding or integrated with the application (104) are the Library Routines (106). These are selected libraries and functions from the operating system that are essential for the application's operation. This might include libraries for network communication, file system interaction, or security operations. Unlike traditional operating systems, where a wide range of libraries are available, only the ones needed by the application are included, significantly reducing the overall size and complexity.

The inclusion of File Systems (108) within the Unikernel demonstrates how file management capabilities are tailored specifically to the application's needs. This component ensures that the application can interact with file systems in a manner that is both secure and efficient, without the overhead of unnecessary file system features.

Device Input/Output (110) is crucial for the application to interact with the hardware. This might include network adapters, storage devices, or other peripherals. In FIG. 1A, Device I/O (110) would be optimized to include only the drivers and interfaces required for the devices the application needs to communicate with, further minimizing the Unikernel's footprint.

Finally, the Networking component (112) represents the networking stack included within the Unikernel. This stack enables the application to communicate over networks. It is optimized for the specific types of network communication the application requires, such as TCP/IP for internet connectivity or specialized protocols for IoT devices.

Each of these components (102, 104, 106, 108, 110, 112) is depicted within the unified structure of the Unikernel 100, illustrating how Unikernels consolidate all necessary functionalities into a single, efficient executable. This architecture not only enhances performance and security but also demonstrates the Unikernel's suitability for cloud and distributed computing environments, where resources are at a premium and security is of utmost importance.

By way of non-limiting disclosure, FIGS. 1B and 1C contrast Unikernel deployments (FIG. 1B) with traditional virtual machine deployments (FIG. 1C).

FIG. 1B illustrates the deployment architecture of Unikernels within a virtualized environment. Several virtual machines (VMs) are shown (122, 124), each running a Unikernel. Unlike traditional VMs that load a full operating system, these VMs are specialized to run a single application, along with the minimal set of operating system functionalities required by that application. Each VM hosts a Unikernel, which is an optimized combination of an application (122A, 124A) and the necessary parts of the operating system (122B, 124B) compiled into a single executable image. Unikernels are designed to be lightweight, providing the essential services (like network stack, file system, etc.) required for the application's execution. A hypervisor layer (126) manages the VMs, abstracting them from the physical hardware. This component is responsible for allocating resources to each VM and ensuring isolation between them. The hypervisor allows multiple Unikernel VMs to share the same physical server efficiently. Physical hardware (128), such as a server, hosts the hypervisor and the Unikernel VMs. This hardware provides the compute, storage, and networking resources used by the VMs.

FIG. 1C, in contrast, depicts a traditional virtual machine deployment, emphasizing the differences with the Unikernel approach. Similar to FIG. 1B, multiple VMs are shown. However, in this traditional setup, each VM loads a full operating system along with the application it runs. This includes the kernel, system libraries, and other OS components, regardless of whether the application uses them. Each VM includes a complete operating system stack, illustrating the kernel and the user space where applications execute. This setup contrasts with the streamlined approach of Unikernels, demonstrating the additional overhead associated with loading and running a full OS.

Together, FIGS. 1B and 1C serve to contrast the efficient, lightweight nature of Unikernels with the more resource intensive, traditional, VM deployments. Unikernels offer a streamlined, secure, and performant alternative for deploying applications, especially in environments where resource utilization and security are critical concerns. In contrast, traditional VMs provide flexibility and broad compatibility at the cost of increased overhead and complexity.

By way of non-limiting disclosure, FIG. 2 depicts a sophisticated technical architecture for deploying and managing cloud-based applications leveraging Unikernels, an Orchestration Rules Engine, Cyber Security Mesh Architecture (CSMA), MQTT protocol, and Generative AI. This architecture aims to enhance the security, efficiency, and scalability of cloud applications.

Unikernel Orchestration Rules Engine (200): Serves as the central management system that automates the deployment, scaling, and configuration of cloud applications. It orchestrates various components of the architecture to work in harmony, ensuring optimal performance and resource utilization. Regarding functionality, it intelligently managing and orchestrating all cloud resources and services. It automates tasks such as application deployment, auto-scaling based on load, health monitoring, and recovery procedures. The engine utilizes predefined rules and dynamic AI-generated policies to optimize resource use and application performance. It ensures that the cloud environment dynamically adapts to changing conditions and application demands, minimizing manual intervention, and reducing the potential for human error.

Unikernels (201) represent a streamlined execution environment that packages the application with only the necessary operating system elements it requires, eliminating any unnecessary overhead. This setup enhances security and performance by reducing the attack surface and resource usage. By packaging an application with its necessary operating system components into a single executable, Unikernels drastically reduce the computational overhead compared to traditional VMs or containers. This model supports a monolithic approach where the application and OS components are tightly integrated, leading to improved boot times and performance. Unikernels offer a highly secure and efficient deployment model that significantly lowers the risk of security vulnerabilities while ensuring applications run with the minimal necessary resources.

Cache Nodes (208, 210, 212, 214) are distributed caching mechanisms that store frequently accessed data close to where it is needed, reducing latency, and improving the speed of data retrieval. Multiple cache nodes across the cloud infrastructure ensure that data is efficiently served to applications, enhancing overall performance. Distributed cache nodes strategically placed across the cloud infrastructure store and provide quick access to frequently requested data. This reduces the distance data must travel, thereby decreasing latency and improving application response times. They significantly enhance user experience by speeding up application performance, particularly for data-intensive operations, and reduces load on backend systems.

Cloud (204) can include an underlying cloud infrastructure layer, encompassing compute, storage, and networking resources that support the deployment and operation of cloud applications. This layer is foundational to the architecture, providing the essential resources that other components (e.g., Unikernels, AI components) utilize to perform their functions. It can also include a platform-as-a-service (PaaS) or infrastructure-as-a-service (IaaS) layer within the architecture, offering a suite of services that facilitate application development, deployment, and management. It can include development tools, database management services, and application monitoring tools, among others. Cloud (204) can also incorporate the management and operational aspect of the cloud environment, focusing on aspects such as resource allocation, scaling, monitoring, and security management. This would encompass the tools and services used to manage the cloud infrastructure and applications, ensuring they run efficiently and securely. Further, Cloud (204) can include the virtual network fabric that interconnects all components within the cloud architecture. This network fabric enables communication between services, applications, and external connections, playing a crucial role in the overall performance and scalability of the cloud environment.

The Unikernel Orchestration Rules Engine 200 also includes Generative AI with Set of Rules Defined (206), which utilizes advanced AI algorithms to dynamically generate deployment strategies and solve complex problems encountered during application deployment. It can create a path for critical applications that are having issues while installing or hosting into cloud environment. This component adapts to the unique requirements of each application, optimizing resource allocation and configuration for improved performance and scalability. It can use generative artificial intelligence to create optimal deployment strategies and configurations. This AI assesses the application's needs, the current state of the cloud environment, and potential constraints to generate the best action plans for deployment, scaling, and maintenance. It can allow for highly customized and optimized application deployments, reducing manual configuration efforts and improving application performance and resource efficiency.

MQTT Protocol (216) is a lightweight messaging protocol used for the efficient transmission of data between devices and/or the cloud infrastructure. It is optimized for high-latency or unreliable networks, making it suitable for IoT devices and other scenarios where network efficiency is critical. Enhanced with encryption, it ensures secure communication. It is a machine-to-machine (M2M) communication protocol designed for lightweight, efficient transmission of data. Its use of a publish-subscribe model is ideal for scenarios where devices or services need to exchange messages with minimal bandwidth usage. It facilitates reliable, secure communication between IoT devices and the cloud or between different microservices within a cloud architecture, even over unreliable networks.

AI Network Assisted Annotation (218) is operatively coupled to the cache nodes in the orchestration rules engine via utilization of the MQTT protocol. AI Network Assisted Annotation refers to the use of AI to enhance network operations, through automated annotations or optimizations that improve network efficiency and application performance. It involves the application of AI to enhance network configurations, performance, and security. AI algorithms analyze network traffic patterns, predict bottlenecks, and automatically apply optimizations or security configurations to improve data flow and protect against threats. It enhances the network's adaptability and resilience, enabling it to automatically optimize for performance and security without manual oversight.

CSMA Security (220) is a comprehensive security framework that encompasses advanced analytics for threat detection, unified policy management, and identity management across the cloud ecosystem. It creates a secure, resilient cloud environment that can dynamically respond to emerging threats and maintain strict access control, ensuring data integrity and compliance with regulatory standards. It can include three primary sub-components.

Security Analytics and Intelligence (222) analyzes data in real time to identify potential security threats and vulnerabilities. As such, Security Analytics and Intelligence form a critical layer in the Cyber Security Mesh Architecture (CSMA), focused on the continuous monitoring, analysis, and interpretation of data generated across the cloud environment to identify potential security threats and vulnerabilities. This component leverages advanced analytics, machine learning algorithms, and pattern recognition to sift through vast amounts of data in real time, identifying anomalies, suspicious activities, and potential breaches. It can perform Real-Time Monitoring through continuous scans for unusual activity patterns that could indicate a security threat, enabling immediate response to potential incidents. It can integrate with external threat intelligence feeds to understand evolving threats and apply this knowledge to improve detection capabilities. It can utilize machine learning to understand normal behavior patterns within the cloud environment and detect deviations that could indicate a compromise or malicious activity. It can include tools for in-depth investigation of security incidents, enabling rapid diagnosis and formulation of an effective response strategy. The goal of Security Analytics and Intelligence is not just to react to threats but to predict and prevent them before they can impact the cloud environment, enhancing the overall security posture.

Consolidated Policy and Procedure Management (224) acts as the governance backbone of the cloud architecture, centralizing the creation, management, and enforcement of security policies and procedures across all cloud services and applications. This ensures a consistent security stance and compliance with regulatory standards across the entire cloud environment. It establishes a single source of truth for security policies, ensuring consistency and eliminating conflicts between policies applied to different components or services. It automates the process of verifying that cloud resources and applications comply with established policies and regulatory requirements, streamlining compliance efforts. It manages the entire lifecycle of security policies, from creation and testing to deployment and monitoring, ensuring they remain effective and up to date. It standardizes security procedures, such as incident response and patch management, across the cloud environment to ensure a coordinated and efficient approach to security management. By consolidating policy and procedure management, organizations can more effectively enforce security controls, ensuring a secure and compliant cloud environment.

Consolidated Dashboards (226) provide a unified, real-time view of the cloud environment's security posture, performance metrics, and operational status. These dashboards aggregate data from various sources, presenting it in an intuitive and actionable format for IT and security teams. It can provide holistic visibility by offering comprehensive visibility into the security and operational health of the cloud environment, enabling quick identification of issues or anomalies. It can allow for the customization of dashboard views to meet the specific needs of different roles or functions within the organization, ensuring relevant information is readily accessible. Alerts and notifications can be implemented by integrating alerting mechanisms to notify relevant personnel of critical incidents, policy violations, or system performance issues, enabling rapid response. It can track key performance indicators (KPIs) and metrics related to application performance, resource utilization, and service levels, facilitating informed decision-making. Consolidated Dashboards serve as the central hub for monitoring and managing the cloud environment, enhancing situational awareness, and enabling proactive management of security and performance.

Together, Security Analytics and Intelligence, Consolidated Policy and Procedure Management, and Consolidated Dashboards form the core of an effective cloud security and management strategy. They provide the tools and insights necessary to maintain a secure, compliant, and efficiently managed cloud environment, crucial for today's complex and dynamic cloud ecosystems.

Distributed Identity Fabric (228) manages identities and access across various platforms, ensuring secure and controlled access to resources, and operatively couples the CSMA Security 220 with the application platform. The Distributed Identity Fabric (228) is an integral part of the architecture that addresses the complex challenges of identity and access management (IAM) across a distributed digital landscape. As cloud environments become more heterogeneous and interconnected, traditional IAM systems, which often operate in silos, struggle to provide the flexibility and security needed for today's dynamic ecosystems. The Distributed Identity Fabric weaves together various identity services and systems into a coherent, unified framework that supports diverse applications, services, and platforms.

Core Aspects of the Distributed Identity Fabric:
 a. Interoperability: One of the primary features of a Distributed Identity Fabric is its ability to interoperate across different domains, platforms, and cloud environments. It integrates various identity providers (IdPs), directories, and authentication services, enabling seamless identity verification and access management regardless of the underlying technology or platform.
 b. Decentralization: Unlike traditional centralized IAM systems, the fabric adopts a more decentralized approach, distributing identity data and services across the network. This not only enhances scalability and availability but also reduces single points of failure, making the identity infrastructure more resilient to attacks and outages.
 c. Context-Aware Access Control: The fabric employs context-aware access controls that consider various factors such as user location, device security posture, time of access, and transaction risk level. This adaptive approach allows for more granular and dynamic access decisions, improving security while ensuring a smooth user experience.
 d. Unified Policy Management: It provides a centralized platform for managing access policies across all integrated systems and services. This unified policy management ensures consistent enforcement of access rules and compliance standards, simplifying governance and reducing administrative overhead.
 e. Identity Federation: The fabric supports identity federation standards such as SAML, OpenID Connect, and OAuth, enabling users to securely access multiple applications and services with a single set of credentials. This not only enhances user convenience but also streamlines the authentication process across different ecosystems.
 f. Privacy and Consent Management: With increasing regulatory requirements and growing concerns over data privacy, the Distributed Identity Fabric incorporates mechanisms for managing user consent and privacy preferences. This ensures that personal information is handled in compliance with data protection laws and user consent is obtained for data processing activities.

Application Platform (230) serves as the foundational layer that offers the runtime environment, development framework, and deployment capabilities needed for applications. This platform is designed to support a wide array of programming languages, frameworks, and architectures, ensuring that developers can build, deploy, and manage their applications efficiently, regardless of the underlying technology. It supports various programming languages such as Java, .NET, Python, and more, allowing developers to use their preferred language or the best-suited one for their application. It offers extensive support for a range of frameworks and libraries, enabling the development of both monolithic applications and microservices architectures. It provides built-in scaling capabilities, allowing applications to scale horizontally or vertically automatically or manually based on demand, ensuring optimal performance and resource utilization. It supports multiple deployment models, including containers, serverless functions, and traditional VMs, providing developers with the flexibility to choose the most appropriate deployment strategy for their applications. Regarding integrated development and operations tools, it can include a suite of tools for continuous integration and continuous deployment (CI/CD), monitoring, logging, and performance management, facilitating DevOps practices and enhancing application lifecycle management. By offering a robust, flexible application platform, organizations can accelerate development cycles, improve deployment efficiency, and ensure that applications are built on a solid, scalable foundation. This platform serves as the bedrock for innovation, enabling developers to focus on creating value rather than managing infrastructure complexities.

Applications Hosted Under Several Platforms (232) signifies the diverse ecosystem of applications that are deployed and managed within the cloud architecture, highlighting the system's capability to accommodate various types of applications, from legacy systems to modern, cloud-native solutions. It can encompass a wide range of applications, including web applications, mobile backends, IoT solutions, and data analytics platforms, catering to different business needs and user scenarios. It is capable of hosting both traditional legacy applications requiring specific runtime environments and modern, containerized microservices that leverage cloud-native technologies. It ensures seamless communication and integration among applications hosted under different platforms, facilitating data exchange, shared services, and collaborative processes across the entire digital landscape. It provides a secure hosting environment with compliance controls embedded into the platform, ensuring that applications meet regulatory requirements and data protection standards.

In summary, Application Platform (230) and Applications Hosted Under Several Platforms (232) underscore the architecture's comprehensive support for diverse development paradigms and operational strategies. This inclusive approach not only enhances the system's flexibility and scalability but also positions it as a versatile solution capable of supporting the dynamic needs of modern enterprises in their digital transformation journeys.

Generative AI with Set of Rules Defined (234) has similar functionality and capability as 206. It can utilize advanced AI algorithms to dynamically generate deployment strategies and solve complex problems encountered during application deployment. This component adapts to the unique requirements of each application, optimizing resource allocation and configuration for improved performance and scalability.

Overall, FIG. 2 presents a detailed view of a highly advanced and integrated system designed for cloud application deployment. It combines the speed and security of Unikernels with the intelligence of AI, the robustness of CSMA security, and the efficiency of MQTT communication, all orchestrated seamlessly to provide a secure, efficient, and scalable cloud application hosting solution.

Figure 3:
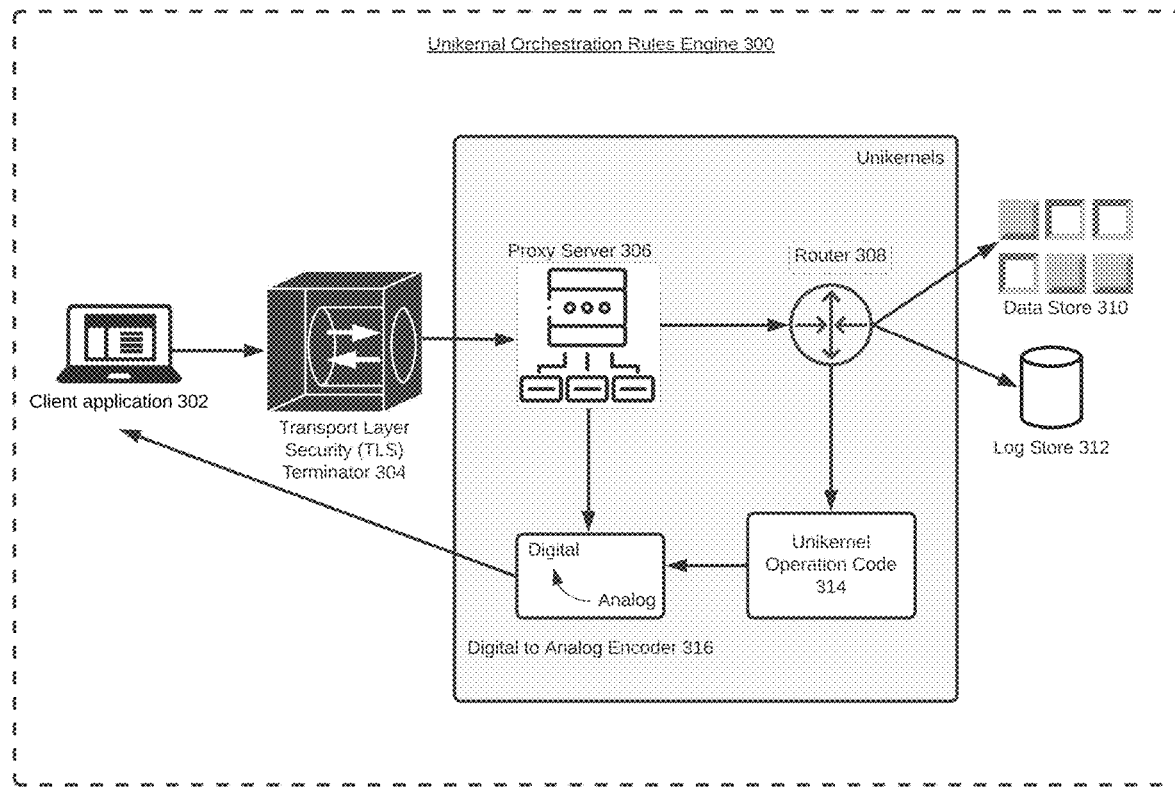
FIG. 3 presents a detailed orchestration system for cloud deployments, highlighting the integration of Unikernels with a proxy server, router, TLS termination, and digital-to-analog encoding, supported by a generative AI framework and comprehensive security and monitoring mechanisms.

By way of non-limiting disclosure, FIG. 3 provides a detailed view of a sample architecture focusing on the deployment and operation of applications using Unikernels, emphasizing security, efficiency, and communication.

Unikernel Orchestration Rules Engine (300) is the central component responsible for managing and orchestrating Unikernel instances. It automates the deployment, scaling, and management processes for applications encapsulated in Unikernels, ensuring optimal resource use and operational efficiency. It acts as the core of the Unikernel deployment, interpreting policies, managing lifecycle events, and ensuring compliance with security and operational policies. Beyond basic orchestration, this engine incorporates intelligent decision-making capabilities powered by AI or rule-based logic. It dynamically adjusts resources, scales applications in response to demand, and manages the deployment lifecycle of each Unikernel instance. It enforces security policies at the orchestration level, ensuring that only compliant Unikernel instances are deployed. This integration is crucial for maintaining a secure and trusted cloud environment.

Client Application (302) represents the user-facing application or service running on the Unikernel. This component is the endpoint that interacts with users or external systems, processing requests and delivering responses. It serves as the primary interface for users, handling incoming requests and generating outcomes based on the application logic. This component is designed to handle diverse user interactions, ranging from web requests to API calls, acting as the entry point for the service offered by the Unikernel. It is optimized for performance and scalability within the Unikernel environment. It is capable of adapting to various types of client devices and protocols, ensuring broad accessibility and a seamless user experience.

Transport Layer Security (TLS) Terminator (304) is a security component that handles encryption and decryption of TLS/SSL protocols. By offloading TLS processing from the Unikernels, it enhances performance and security. It secures communication channels, ensuring that data transmitted between the client application and the server is encrypted and protected from interception or tampering.

Proxy Server (306) facilitates communication between the client applications and the Unikernels. It acts as an intermediary, receiving requests from clients and forwarding them to the appropriate Unikernel instance. It improves network efficiency, manages load balancing, and provides an additional layer of abstraction and control over client-server communications. It can distribute incoming traffic among various Unikernels based on load, health status, and other policies, ensuring high availability and fault tolerance. It can also perform content caching to reduce latency and improve response times for frequently requested resources.

Router (308) couples proxy server (306) with Data Store (310) and Log Store (312). Router (308) manages network traffic between the components and ensures that data is efficiently and security transmitted across the system. Various features include:

a. Network Traffic Management: Acts as a pivotal network device that forwards data packets between computer networks. Router 308 would manage traffic within the cloud infrastructure, ensuring that requests from clients are directed to the appropriate Unikernels and that the network remains efficient and congestion-free. It can implement sophisticated routing algorithms to optimize the path of network traffic, based on various criteria such as load, latency, or specific routing policies.

b. Security and Isolation: Provides an additional layer of security by segmenting the network, thereby isolating different parts of the cloud environment. This segmentation can prevent unauthorized access and contain potential breaches within isolated network zones. It can include VPN support, and intrusion detection capabilities to enhance the security posture of the cloud architecture.

c. Integration with Unikernels: Able to direct traffic to and from Unikernels, which are lightweight, isolated environments, especially given their potentially ephemeral nature and high scalability requirements. If offers dynamic routing capabilities to accommodate the on-demand scaling of Unikernels, adjusting routing rules automatically as Unikernels are instantiated or decommissioned.

d. Load Balancing and High Availability: Beyond simple routing, it can also perform load balancing, distributing incoming requests evenly across multiple Unikernels to ensure high availability and balanced resource utilization. It supports failover mechanisms and redundancy protocols to maintain service continuity in case of individual component failures.

In the sophisticated cloud architecture described, particularly one that leverages Unikernels and an advanced orchestration engine for application deployment and management, Data Store (310) assumes a pivotal role. It functions as the centralized repository for a wide array of data types, including but not limited to application data, configurations, state information, and possibly logs or metrics. This centralization is critical for managing the complexity and volume of data generated within cloud environments, ensuring that applications have immediate access to the data they need with minimal latency.

The Data Store 310 is designed to support high availability and scalability, key requirements for cloud-native applications. It achieves this through strategies such as data replication, sharding, and partitioning, which not only distribute data across multiple nodes or locations to enhance availability but also ensure that the system can scale efficiently to handle growing data volumes and user demands. This scalability is particularly crucial in systems utilizing Unikernels, as the Data Store provides a persistent layer for these lightweight, isolated environments to perform data operations. To facilitate efficient interactions, the Data Store may offer optimized access patterns and protocols, possibly through APIs or SDKs tailored specifically for these minimalistic operational environments.

Moreover, the Data Store (310) is adept at handling both transactional (OLTP) and analytical (OLAP) workloads, enabling a broad spectrum of data operations from simple CRUD activities to complex analytics and reporting. This versatility ensures that applications can perform a wide range of data manipulations and analyses, catering to diverse business needs. Embedded within its framework are robust security measures aimed at protecting sensitive data and ensuring compliance with stringent data protection regulations. Features such as data encryption, both at rest and in transit, access control mechanisms, auditing capabilities, and data anonymization or masking tools are integral to its design. These features not only secure the data but also manage privacy effectively, addressing the critical demand for data security and regulatory compliance in today's digital landscape.

In essence, Data Store 310 underpins the architecture's capability to deliver reliable, high-performance cloud services. It provides a robust, secure, and scalable foundation for data management, supporting the operational and analytical needs of modern applications and thereby enhancing the overall effectiveness and efficiency of the cloud environment.

Within the intricately designed cloud architecture that harnesses Unikernels for streamlined application deployment, the Log Store (312) emerges as a fundamental component, tasked with the comprehensive collection of logs across the entirety of the Unikernel operations. This encompasses a wide array of data points, from system events and application errors to security incidents, thereby assembling a rich dataset poised for in-depth analysis. The significance of the Log Store extends beyond mere data collection; it is instrumental in facilitating a proactive approach to managing and optimizing the cloud environment. By feeding detailed log data into advanced analytics and monitoring tools, it unlocks valuable insights into application performance, user behavior, and potential security threats. This analytical capability enables IT teams to not only react swiftly to emerging issues but also to anticipate and mitigate potential problems before they impact the system's integrity or performance. In doing so, the Log Store (312) plays a pivotal role in ensuring the cloud environment's resilience, security, and overall operational efficiency. By leveraging the detailed logs and insights generated, organizations can fine-tune their applications and systems for optimal performance, enhance security measures based on observed threats, and improve user experience by understanding and addressing behavioral patterns.

Within the context of the described cloud architecture, the Unikernel Operation Code (314) represents a critical aspect of the Unikernel's functionality, encapsulating the essence of how these lightweight, isolated environments operate. This operation code is essentially the core of the Unikernel, combining the application logic with the minimal necessary set of operating system libraries and routines required for the application's execution. Unlike traditional cloud or server environments where applications run atop a general-purpose operating system, Unikernels are designed to include only those OS elements that are absolutely necessary for the specific application they host. This bespoke approach results in an operational footprint that is significantly reduced in size, enhancing both efficiency and security.

The Unikernel Operation Code (314) thus serves a dual purpose. Firstly, it ensures that the application can execute as intended, with all the required computational logic and system calls being processed within the Unikernel's streamlined environment. This includes handling requests, executing business logic, and managing data operations, all within a contained space that is optimally designed for speed and reliability. Secondly, by paring down the operating system components to the bare minimum, the Unikernel Operation Code minimizes the potential attack surface for malicious activities, inherently bolstering the system's security posture.

The design of Unikernel Operation Code (314) reflects a move towards more efficient, secure, and specialized computing environments in cloud infrastructure. By compiling the application together with its operating environment into a single executable, the Unikernel architecture facilitates rapid deployment, scales efficiently, and significantly reduces runtime overhead. This approach not only streamlines development and operations but also offers tangible benefits in terms of reduced latency, improved performance, and enhanced security, making it an attractive option for deploying a wide range of applications in the cloud.

Digital to Analog Encoder (316) can be operatively coupled to Proxy Server (306) and Unikernel Operation Code (314). The encoder enables converting digital signals into analog format, for interfacing with legacy systems or specific types of hardware. It ensures compatibility and integration between digital cloud services and analog or physical systems, bridging the gap between modern cloud applications and older technologies or devices.

FIG. 3 illustrates a comprehensive architecture that leverages the efficiency and security of Unikernels, enhanced by an orchestration layer, robust security mechanisms, and support for both digital and analog interoperability. This design highlights the system's capability to deliver secure, efficient, and scalable cloud services while ensuring compatibility with a wide range of technologies and operational requirements.

Thus, the foregoing technical solution of FIGS. 2 and 3 introduce an advanced, AI-driven secure protocol channel, designed to streamline the deployment of projects in the cloud in real-time, utilizing the efficiency and security of Unikernels. This innovative approach ensures applications can be easily integrated and managed within the cloud infrastructure, establishing an optimal operational environment for smooth application performance.

At the core of the solution are Unikernel containers, which host applications on the cloud, enabling efficient handling of requests and responses. These containers are characterized by their lightweight nature, which significantly reduces the overhead typically associated with traditional virtual machines, thereby enhancing performance and security.

To bolster security and address vulnerabilities before application migration, the solution integrates the Cyber Security Mesh Architecture (CSMA). This comprehensive security framework includes several key components: Security Analytics and Intelligence for real-time threat detection, Distributed Identity Fabric for managing identities across platforms, Consolidated Policy and Posture Management for unified security policy enforcement, and Consolidated Dashboards for an overarching view of the security posture. Together, these elements create a robust defense mechanism that secures applications throughout their lifecycle in the cloud.

Communication security is ensured through the implementation of the MQTT Protocol, enhanced with SHA256 encryption. This setup guarantees the secure transmission of package information across the cloud, safeguarding data integrity and confidentiality.

A pivotal component of the architecture is the Unikernels Orchestration Rules Engine (UORE), which orchestrates the deployment and management of Unikernel containers. The UORE includes several essential components such as a TLS terminator for secure communications, an encoder for data processing, a proxy and router for efficient network traffic management, and dedicated Unikernels-Op, Data Store, and Log Store for operational support. These components work in unison to establish connections and create a conducive environment for application deployment and execution.

The proposed technical solution introduces a multifaceted approach to cloud application deployment, harnessing the capabilities of Unikernel containers, Cyber Security Mesh Architecture (CSMA), MQTT Protocol, Unikernels Orchestration Rules Engine (UORE), Distributed Identity Fabric (DIF), Generative AI, and a sophisticated Caching mechanism. This approach is designed to enhance security, efficiency, and manageability across the cloud computing spectrum. Core inventive features include:

a. Unikernel Containers for Cloud Hosting: The architecture utilizes Unikernel containers to host applications in the cloud environment. These containers are specialized, lightweight execution environments that package an application with the minimal set of operating system libraries required for its operation. By doing so, they significantly reduce the computational overhead and enhance the security posture by limiting the attack surface. This setup ensures that applications can efficiently handle requests and responses, providing a seamless interaction experience for end-users.

b. Integrated CSMA for Enhanced Security: The solution employs the Cyber Security Mesh Architecture, a cutting-edge security framework, to conduct thorough security checks and vulnerability assessments before application migration. CSMA integrates several key components, including Security Analytics and Intelligence for real-time threat detection, Distributed Identity Fabric for secure identity management, Consolidated Policy and Posture Management for uniform security policy enforcement, and Consolidated Dashboards for a comprehensive view of the security landscape. This holistic approach to security ensures that applications are protected from emerging threats throughout their lifecycle in the cloud.

c. Secure Communication with MQTT Protocol: For secure data transmission, the architecture incorporates the MQTT Protocol, a lightweight messaging protocol designed for the efficient exchange of messages in high-latency or unreliable networks. Enhanced with SHA256 encryption, it ensures the confidentiality and integrity of package information as it traverses the cloud, delivering data securely to the intended cloud node.

d. Unikernels Orchestration Rules Engine (UORE): At the center of the deployment strategy is the UORE, which orchestrates the application deployment and management process. This engine comprises essential components such as a TLS terminator for secure communications, an encoder for data processing, and a proxy and router system for effective network traffic management. Alongside Unikernels-Op, Data Store, and Log Store, the UORE creates an optimized environment for applications, facilitating their smooth operation in the cloud.

e. Distributed Identity Fabric for Identity Management: The solution adopts the Distributed Identity Fabric to offer a comprehensive and adaptable framework for managing digital identities across the entire IT environment. This framework covers all aspects of identity and access management (IAM), including authentication, authorization, identity lifecycle management, governance, and privacy and consent management, ensuring secure and controlled access to cloud resources.

f. Generative AI for Custom Deployment Paths: Leveraging generative AI, the system dynamically generates optimal deployment strategies for applications facing installation or hosting challenges. This AI-driven approach allows for customized solutions for critical applications, ensuring that even complex systems like Base24 for payments or Python-based applications are efficiently deployed and managed in the cloud.

g. Caching Mechanism for Enhanced Performance: To improve connection speeds and overall cloud performance, a distributed caching mechanism is integrated across multiple nodes. This system acts as a buffer, storing frequently accessed data close to the point of use. Once a connection is established, the cache is automatically cleared, readying the system to efficiently handle subsequent requests.

In summary, this comprehensive technical solution synthesizes a suite of advanced technologies and methodologies, including Unikernels, Cyber Security Mesh Architecture (CSMA), secure MQTT communication, and an intelligent orchestration engine, to facilitate the streamlined deployment and management of applications within the cloud. By tackling the pivotal challenges of security, efficiency, and scalability head-on, this architecture delivers a robust and reliable platform capable of hosting a diverse array of applications. It ensures that these applications not only achieve optimal performance but also maintain the highest standards of security and reliability in the cloud environment. This holistic strategy enhances the process of onboarding applications, securing them in an optimized environment that squarely addresses the contemporary challenges faced in cloud computing, thereby providing a secure, efficient, and scalable framework for cloud application deployment.

Figure 4:
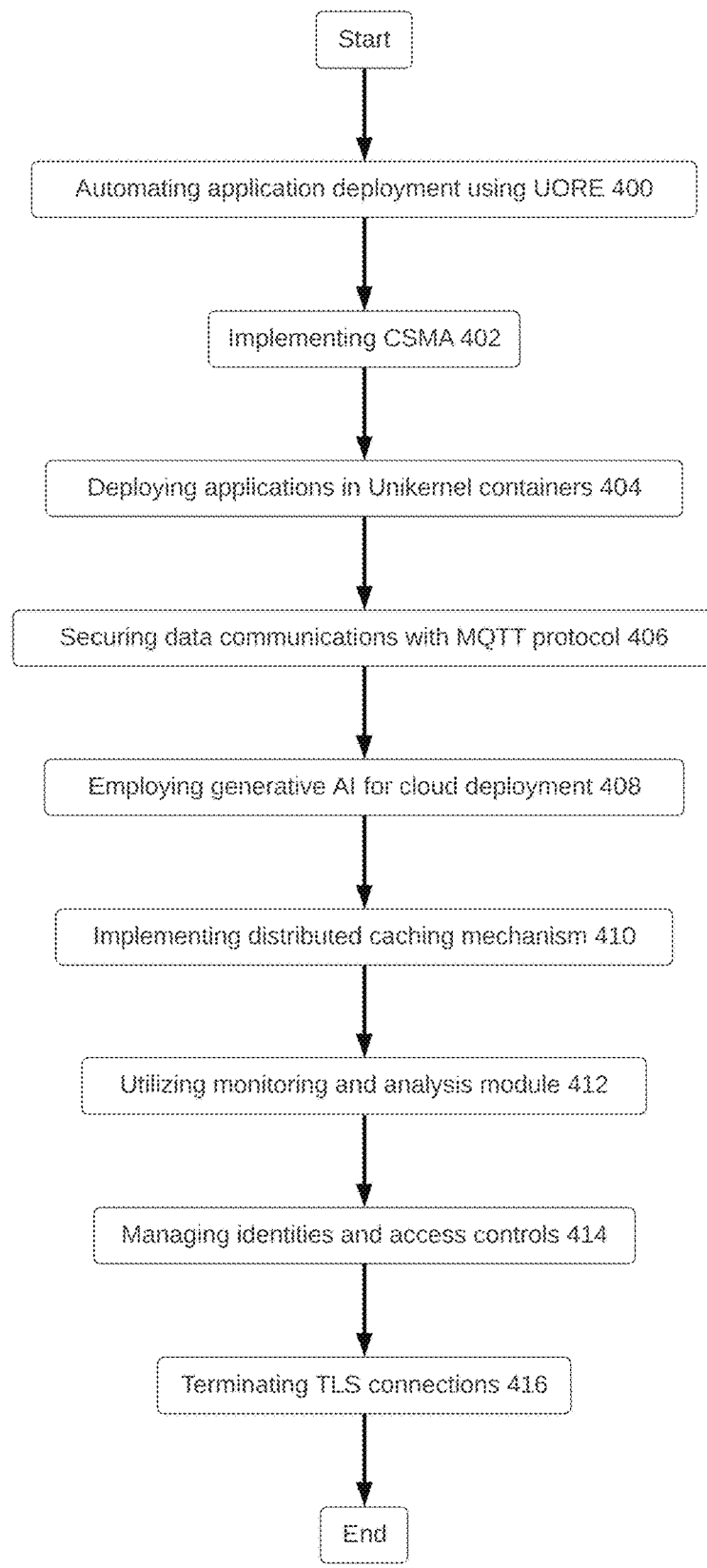
FIG. 4 illustrates a sequential flowchart for deploying and managing cloud projects, outlining steps from automating application deployment to terminating TLS connections, emphasizing security, efficiency, and AI optimization.

By way of non-limiting disclosure, FIG. 4 is a flow diagram showing a sample method for deploying and managing projects on cloud platforms. This figure outlines sample steps involved in an exemplary deployment process, from initiation to completion, employing a range of sophisticated technologies and approaches to enhance security, efficiency, and scalability of cloud-based deployments.

Start (Begin of Process): The process begins by setting the stage for deploying and managing applications within a cloud environment, aiming to leverage advanced techniques for optimization and security.

Automating Application Deployment Using UORE (400): The first operational step involves the use of a Unikernels Orchestration Rules Engine (UORE) to automate the deployment and ongoing management of applications. This step ensures the efficient utilization of cloud resources and optimizes operational performance, significantly streamlining the deployment process.

Implementing CSMA (402): Following automation, the Cyber Security Mesh Architecture (CSMA) is implemented to establish a comprehensive security framework. This architecture integrates advanced analytics for real-time threat detection, distributed identity management for secure access control, consolidated policy management for enforcing uniform security protocols, and a unified dashboard for an overarching view of the security posture. The CSMA plays a crucial role in safeguarding the cloud environment against potential threats.

Deploying Applications in Unikernel Containers (404): Applications are then deployed within Unikernel containers, which encapsulate each application with only the essential operating system components needed for execution. This approach creates lightweight and secure execution environments that minimize computational overhead, thereby enhancing both security and performance.

Securing Data Communications with MQTT Protocol (406): The method includes securing data communications across the cloud using an MQTT protocol enhanced with SHA256 encryption. This step is vital for safeguarding data integrity and confidentiality, ensuring that communication within the cloud is protected against unauthorized access.

Employing Generative AI for Cloud Deployment (408): Generative AI is employed to dynamically adapt and optimize the cloud deployment process. By analyzing each application's unique requirements and challenges, the AI generates custom deployment strategies and solutions, facilitating efficient and effective deployment of diverse applications.

Implementing Distributed Caching Mechanism (410): A distributed caching mechanism is implemented across cloud nodes to enhance cloud performance and efficiency. By reducing latency and accelerating data retrieval processes, this mechanism significantly improves the responsiveness and user experience of cloud-hosted applications.

Utilizing Monitoring and Analysis Module (412): The monitoring and analysis module, equipped with consolidated dashboards provided by the CSMA, enables real-time visibility into application health, performance metrics, and security alerts. This step is essential for proactive cloud management and optimization, allowing for immediate response to any issues that may arise.

Managing Identities and Access Controls (414): Managing digital identities and access controls is achieved through a Distributed Identity Fabric. This step ensures secure and controlled access to cloud resources by efficiently managing authentication and authorization processes, enhancing overall security and compliance.

Terminating TLS Connections (416): The final step in the deployment process involves terminating Transport Layer Security (TLS) connections. This is done to improve data security and resource efficiency during data transmission between client applications and the cloud infrastructure, ensuring that data in transit is securely encrypted.

End (Completion of Process): The process concludes once all steps are successfully executed, marking the end of the deployment and management cycle for projects on cloud platforms.

Overall, FIG. 4 provides a clear and sequential representation of the method for deploying and managing projects on cloud platforms, highlighting the integration of advanced technologies and methodologies to achieve a secure, efficient, and scalable cloud environment.

Figure 5:
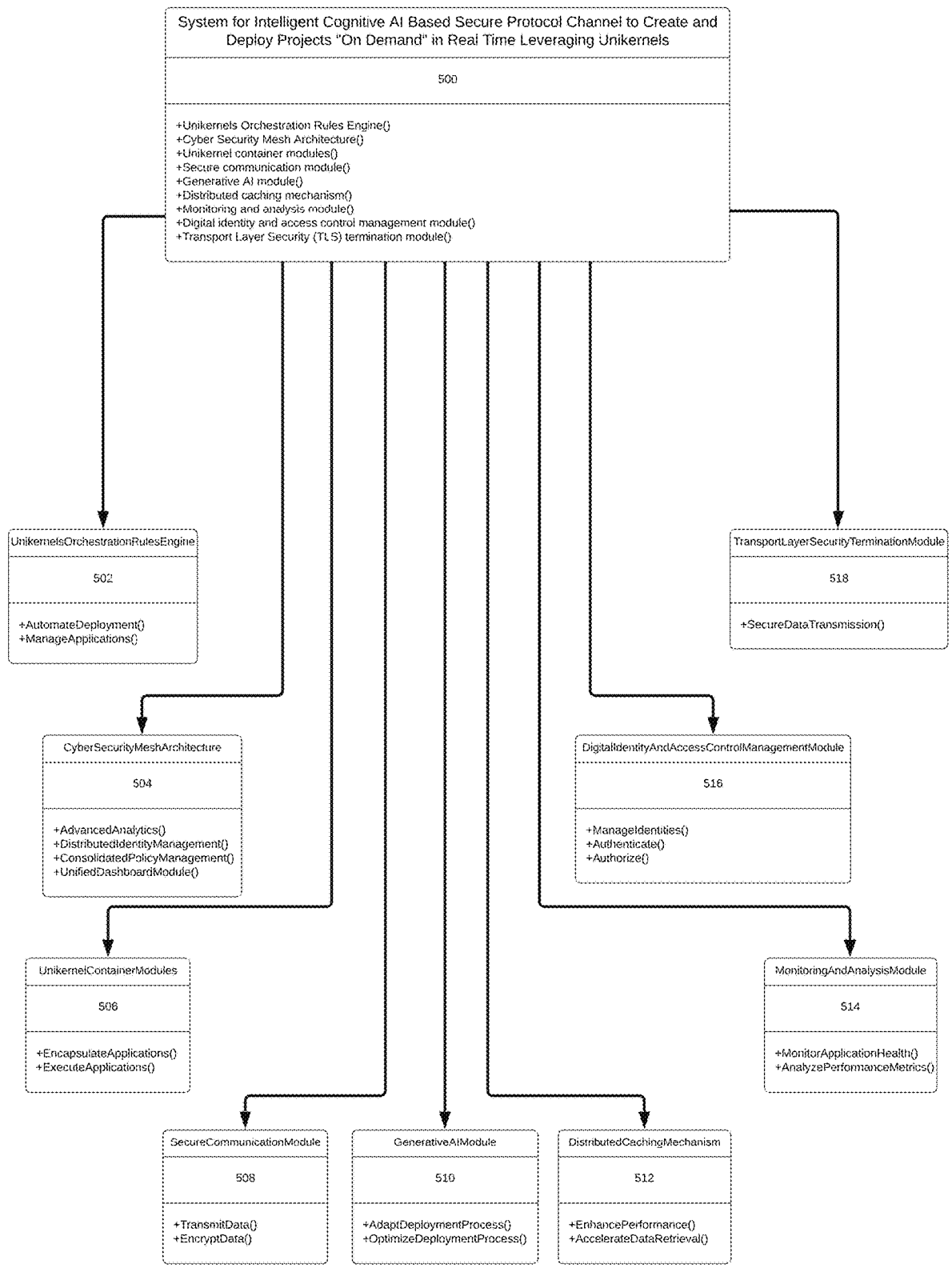
FIG. 5 details a class diagram of a system designed for secure and efficient cloud project deployment, featuring components like Unikernels Orchestration, Cyber Security Mesh Architecture, and Generative AI, aimed at enhancing real-time deployment and management.

By way of non-limiting disclosure, FIG. 5 illustrates a sample class diagram for a sophisticated system designed to facilitate the creation and deployment of projects on cloud platforms in real-time, leveraging the power of Unikernels and intelligent cognitive AI. This system (500) incorporates various modules, each with specific functionalities aimed at enhancing the security, efficiency, and scalability of cloud-based deployments. Here is an expanded explanation of each class and their roles within the system:

Unikernels Orchestration Rules Engine (502): Central to the system (500), this class automates the deployment and application management processes within the cloud. It significantly reduces manual intervention, ensuring that applications are deployed and scaled efficiently. This engine is critical for orchestrating the various components of the system to work in unison, providing a seamless operational experience.

Cyber Security Mesh Architecture (504): This class establishes a robust security infrastructure that permeates through the entire cloud deployment. By integrating advanced analytics, it enables real-time monitoring for threats, utilizing distributed identity management to secure access control, and employing consolidated policy management for the enforcement of security protocols. The unified dashboard module offers administrators a holistic view of the security posture, enabling quick responses to security challenges.

Unikernel Container Modules (506): These modules encapsulate applications with the minimal set of necessary operating system libraries, creating an efficient, lightweight, and isolated environment for each application. This not only reduces the resource consumption but also minimizes the attack surface, significantly enhancing application security.

Secure Communication Module (508): Ensuring the confidentiality and integrity of data as it moves across the cloud, this class employs an enhanced MQTT protocol with SHA256 encryption. This is especially critical for protecting sensitive information and ensuring compliance with data protection regulations.

Generative AI Module (510): At the forefront of adaptive technology, this class utilizes AI to analyze the deployment landscape continuously, identifying optimal strategies for deployment. It customizes the deployment process to meet the unique requirements of each application, addressing potential challenges proactively to ensure successful deployments.

Distributed Caching Mechanism (512): This class is designed to improve the performance and efficiency of the cloud infrastructure by implementing a caching strategy that reduces latency and accelerates data retrieval. By storing frequently accessed data closer to its point of use, it significantly enhances the user experience and application responsiveness.

Monitoring and Analysis Module (514): This class provides real-time insights into the health and performance of applications deployed within the cloud. By utilizing consolidated dashboards, administrators can monitor various metrics and security alerts, enabling them to manage and optimize the cloud environment proactively.

Digital Identity and Access Control Management Module (516): Central to managing access within the cloud, this class implements a Distributed Identity Fabric to manage digital identities, authentication, and authorization processes efficiently. This ensures secure and controlled access to cloud resources, enhancing the overall security framework.

Transport Layer Security (TLS) Termination Module (518): Focused on securing data transmission between client applications and the cloud infrastructure, this class offloads SSL/TLS decryption from the Unikernel containers. This not only improves the efficiency of resource usage but also strengthens the security of data during transmission.

In essence, the class diagram in FIG. 5 depicts a comprehensive system architecture designed to leverage the benefits of Unikernels and artificial intelligence in deploying and managing cloud-based projects. Each class is meticulously crafted to fulfill specific roles within the deployment process, working together to create a secure, efficient, and scalable cloud infrastructure.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for deploying projects on cloud platforms to enhance security, efficiency, and scalability, comprising the steps of:

initiating a cloud-based deployment process through a Unikernels Orchestration Rules Engine (UORE) that automates and manages deployment and scaling of applications within a cloud computing environment, ensuring efficient resource utilization and optimal operational performance;

configuring a Cyber Security Mesh Architecture (CSMA) as part of the deployment, wherein the CSMA provides an integrated security framework that includes advanced analytics for real-time threat monitoring, distributed identity management for secure access control, consolidated policy management for uniform security protocol enforcement across the cloud platform, and a unified dashboard for a comprehensive view of the security posture, thereby ensuring a robust defense mechanism against emerging security threats and vulnerabilities; deploying applications within Unikernel containers, where each of said Unikernel containers encapsulates an application along with the minimal, essential set of operating system libraries and routines required for application execution, thereby offering a streamlined, lightweight, and isolated execution environment that reduces computational overhead, minimizes an attack surface for enhanced security, and boosts application performance within a cloud infrastructure;

securing data communication channels through implementation of a Messaging Queue for Telemetry Transport (MQTT) protocol, which is enhanced with SHA256 encryption to safeguard the integrity and confidentiality of data transmissions across the cloud, ensuring secure and reliable messaging between devices and the cloud infrastructure;

employing generative artificial intelligence (AI) techniques to dynamically adapt and optimize the deployment process, wherein a generative AI component analyzes unique requirements and challenges associated with each application deployment, generating custom deployment strategies and solutions to overcome potential hurdles, ensuring that applications are efficiently and effectively deployed on the cloud platforms;

implementing a distributed caching mechanism across multiple cloud nodes to enhance overall performance and efficiency of the cloud infrastructure by reducing latency and accelerating data retrieval processes, wherein the caching mechanism stores frequently accessed data closer to point of use and automatically clears caches post-connection to maintain optimal performance for subsequent requests, thereby improving user experience and application responsiveness;

monitoring and analyzing the deployment process and ongoing performance of deployed applications using consolidated dashboards provided by the CSMA, facilitating real-time visibility into application health, performance metrics, and security alerts, enabling proactive management and optimization of the cloud environment;

managing digital identities and access controls across the cloud platform through the implementation of a Distributed Identity Fabric, which ensures secure and controlled access to cloud resources by efficiently managing identities, authentication, and authorization processes across various platforms and applications within the cloud platform, thereby enhancing security and compliance; and leveraging the generative AI to conduct pre-deployment simulations to predict potential deployment issues and performance bottlenecks, where the generative AI models simulate various deployment scenarios to identify and mitigate risks prior to the actual deployment, enhancing the reliability and success rate of cloud-based project deployments; and terminating Transport Layer Security (TLS) connections as part of the deployment process to ensure secure data transmission between client applications and the cloud infrastructure, wherein a TLS terminator offloads SSL/TLS decryption from the Unikernel containers, improving resource efficiency and bolstering the security of data in transit.

2. The method of claim 1, wherein the distributed caching mechanism is configured to dynamically adjust caching strategies based on real-time application usage patterns and network conditions, thereby ensuring that caching logic is optimized for current operational conditions and user demands, improving the responsiveness and efficiency of cloud-hosted applications.

3. The method of claim 2, further wherein automated scaling of Unikernel containers is based on predefined performance metrics and real-time demand analysis, where the UORE automatically adjusts a number of active Unikernel instances to match the current load, ensuring that resources are efficiently allocated and that application performance is maintained at optimal levels.

4. The method of claim 3, including the implementation of continuous security monitoring within the CSMA, wherein security analytics and intelligence components perform ongoing analysis of security logs, network traffic, and system activities to detect and respond to emerging threats in real-time, thereby maintaining a proactive and dynamic security posture.

5. The method of claim 4, further comprising the step of using machine learning algorithms within the generative AI component to continuously learn from deployment outcomes and operational metrics, thereby refining and improving a generative AI ability to generate effective deployment strategies and solutions over time, enhancing the system's adaptability and performance.

6. The method of claim 5, wherein the monitoring and analysis step involves aggregation and visualization of performance and security metrics across multiple cloud services and platforms, utilizing the consolidated dashboards to provide a unified operational view that enables comprehensive management and optimization of cloud resources and security measures.

7. The method of claim 6, wherein a feedback loop is incorporated from the monitoring and analysis step back to the generative AI and UORE components, wherein insights derived from operational and security metrics inform ongoing adjustments to deployment strategies, security configurations, and resource allocations, creating a continuous improvement cycle for cloud deployments.

8. The method of claim 7, further including the integration of automated incident response protocols within the CSMA, where detected security threats trigger predefined mitigation actions for isolating affected systems, applying security patches, and adjusting access controls, thereby ensuring rapid and effective response to security incidents.

9. The method of claim 8, wherein managing digital identities and access controls includes implementation of multi-factor authentication (MFA) and role-based access controls (RBAC) for all users accessing the cloud platform, further enhancing the security and integrity of cloud-based project deployments by ensuring that access to cloud resources is tightly controlled and that user identities are securely verified.

10. A system for deploying projects on cloud platforms, configured to enhance security, efficiency, and scalability, the system comprising: a hardware processor, an Unikernels Orchestration Rules Engine (UORE) configured to automate the deployment and management of applications within a cloud computing environment, including provisions for efficient resource utilization and optimization of operational performance; "a Cyber Security Mesh Architecture (CSMA) integrated into the system for providing a comprehensive security framework, the CSMA including modules for advanced analytics for real-time threat monitoring, distributed identity management for secure access control, consolidated policy management for uniform security protocol enforcement across the cloud platforms, and a unified dashboard module for comprehensive visibility into the security posture;" Unikernel container modules designed to encapsulate applications along with the minimal, essential set of operating system libraries and routines required for application execution, thereby offering streamlined, lightweight, and isolated execution environments that minimize computational overhead and enhance security; "a secure communication module utilizing a Messaging Queue for Telemetry Transport (MQTT) protocol enhanced with SHA256 encryption to ensure the integrity and 4 confidentiality of data transmissions across the cloud, thereby safeguarding data communication channels;" a generative AI module to dynamically adapt and optimize deployment based on the unique requirements and challenges associated with each application deployment, generating custom deployment strategies and solutions; "a distributed caching mechanism implemented across multiple cloud nodes, configured to enhance the overall performance and efficiency of a cloud infrastructure by reducing latency and accelerating data retrieval processes;" a monitoring and analysis module utilizing consolidated dashboards provided by the CSMA for facilitating real-time visibility into application health, performance metrics, and security alerts, enabling proactive management and optimization of the cloud environment; "a digital identity and access control management module implementing a Distributed Identity Fabric to ensure secure and controlled access to cloud resources by efficiently managing identities, authentication, and authorization processes; and leveraging the generative AI to conduct pre-deployment simulations to predict potential deployment issues and performance bottlenecks, where the generative AI models simulate various deployment scenarios to identify and mitigate risks prior to the actual deployment, enhancing the reliability and success rate of cloud-based project deployments; and a Transport Layer Security (TLS) termination module configured to secure data transmission between client applications and the cloud infrastructure, improving resource efficiency and enhancing data security in transit.

11. The system of claim 10, wherein the distributed caching mechanism includes an adaptive caching strategy module that dynamically adjusts caching strategies based on real-time analysis of application usage patterns and network conditions, ensuring optimal caching logic for current operational states and enhancing responsiveness of cloud-hosted applications.

12. The system of claim 11, further comprising an automated scaling module within the Unikernel container modules, configured to adjust a number of active Unikernel instances based on predefined performance metrics and real-time demand, ensuring efficient resource allocation and maintaining application performance at optimal levels.

13. The system of claim 12, including a continuous security monitoring module within the CSMA, configured for ongoing analysis of security logs, network traffic, and system activities to detect and respond to emerging threats in real-time, thereby maintaining a proactive and adaptive security posture.

14. The system of claim 13, wherein the generative AI module incorporates machine learning algorithms configured to continuously learn from deployment outcomes and operational metrics, thereby refining deployment strategies and solutions over time to enhance system adaptability and performance in cloud deployments.

15. The system of claim 14, wherein the monitoring and analysis module is further configured to aggregate and visualize performance and security metrics across multiple cloud services and platforms, providing a unified operational view through the consolidated dashboards for comprehensive management of cloud resources and security.

16. The system of claim 15, further comprising a feedback mechanism that communicates insights from the monitoring and analysis module back to the generative AI module and the UORE, facilitating ongoing adjustments to deployment strategies, security configurations, and resource allocations based on real-time data, creating a cycle of continuous improvement for cloud deployments.

17. The system of claim 16, including an integrated incident response protocol within the CSMA, configured to trigger predefined mitigation actions upon detection of security threats, including isolating affected systems, applying security patches, and adjusting access controls, thereby ensuring rapid and effective response to security incidents.

18. A method for deploying and managing projects on cloud platforms, the method comprising the steps of: "automating application deployment and management across a cloud computing environment using an Orchestration Rules Engine to ensure efficient utilization of cloud resources and optimize operational performance;6" implementing a Cyber Security Mesh Architecture (CSMA) to provide a comprehensive security framework that utilizes advanced analytics for real-time threat detection, distributed identity management for secure access control, consolidated policy management for enforcing security protocols, and utilizing a unified dashboard for visibility into the security posture; "deploying applications in Unikernel containers that encapsulate each application with only the necessary operating system components required for its execution, thereby creating lightweight and secure execution environments that minimize computational overhead;" securing data communications across the cloud using an MQTT protocol enhanced with SHA256 encryption to safeguard data integrity and confidentiality; "employing generative AI to dynamically adapt and optimize a cloud deployment process for each application, generating custom deployment strategies and solutions based on unique application requirements and challenges;" implementing a distributed caching mechanism across cloud nodes to enhance cloud performance and efficiency by reducing latency and accelerating data retrieval processes; "utilizing a monitoring and analysis module with consolidated dashboards provided by the CSMA to enable real-time visibility into application health, performance metrics, and security alerts, facilitating proactive cloud management and optimization;" managing digital identities and access controls through a Distributed Identity Fabric to ensure secure and controlled access to cloud resources by efficiently managing authentication and authorization processes; and leveraging the generative AI to conduct pre-deployment simulations to predict potential deployment issues and performance bottlenecks, where the generative AI models simulate various deployment scenarios to identify and mitigate risks prior to the actual deployment, enhancing the reliability and success rate of cloud-based project deployments; and terminating Transport Layer Security (TLS) connections to improve data security and resource efficiency during data transmission between client applications and a cloud infrastructure.

* * * * *